United States Patent [19]

Scranton

[11] Patent Number: 4,666,315

[45] Date of Patent: May 19, 1987

[54] PLANAR AND CYLINDRICAL OSCILLATING PNEUMATODYNAMIC BEARINGS

[75] Inventor: Robert A. Scranton, South Salem, N.Y.

[73] Assignee: International Business Machines Corporation, Armonk, N.Y.

[21] Appl. No.: 273,280

[22] Filed: Jun. 12, 1981

[51] Int. Cl.$^4$ ............................................. F16C 32/06
[52] U.S. Cl. ........................................ 384/1; 384/12; 384/99
[58] Field of Search .................... 308/9, 1 R, DIG. 1, 308/5 R, 122, 170, 1 SR; 384/107, 114, 121, 1, 12, 99, 122

[56] References Cited

U.S. PATENT DOCUMENTS

| | | | |
|---|---|---|---|
| 1,860,529 | 5/1932 | Cady . | |
| 2,993,739 | 7/1961 | Hall | 308/1 |
| 3,114,848 | 12/1963 | Kritz | 310/9.1 |
| 3,239,283 | 3/1966 | Broeze et al. . | |
| 3,339,421 | 9/1967 | Warnock | 74/5 |
| 3,351,393 | 11/1967 | Emmerich | 308/9 |
| 3,359,045 | 12/1967 | Hsu | 308/1 |
| 3,433,538 | 3/1969 | Blanding | 308/9 |
| 3,471,205 | 10/1969 | Farron et al. . | |
| 3,626,510 | 12/1971 | Kauzlarich | 308/1 |
| 4,099,211 | 7/1978 | Hathaway | 360/109 |
| 4,106,065 | 8/1978 | Ravizza | 360/109 |
| 4,188,645 | 2/1980 | Ragle et al. | 360/75 |

OTHER PUBLICATIONS

E. O. Salbu "Compressible Squeeze Films and Squeeze Bearings" Trans. ASME Journal of Basic Engineering, 355-366 (Jun. 1964).

*Primary Examiner*—Lenard A. Footland
*Attorney, Agent, or Firm*—Graham S. Jones, II; Alexander Tognino

[57] ABSTRACT

An oscillating pneumatodynamic bearing takes the form of a laminated transducer disk cooperating with a flat surface or a tubular transducer cooperating with a rod or an enclosing tube. Such bearings are also known as squeeze bearings. At least one piezoelectric, magnetostrictive or electrostrictive material is laminated with another material to provide oscillation of the transducer portion of the bearing so that the transducer portion is able to fly above a bearing surface on a fluid which is usually ambient air compressed by the mechanical oscillation of the transducer portion at an ultrasonic frequency. The disk or the tube is connected mechanically to supports and to its electrical sources of energy or signals at points along the loci of zero oscillation or minimal oscillation. With a laminated disk, a nodal circle is the locus of zero oscillation. In the case of the tube, a number of parallel strips of reversed polarity transducer material are alternately connected together by an interdigitated electrode design of spacing grooves between an enveloping conductive layer which overlies the piezoelectric layer laminated to a metallic base. Bearings for armatures of linear motor types of actuators for reciprocating magnetic recording heads within magnetic recording disk files can employ a set of disk type bearings or a combination of a tubular bearing with at least one disk type bearing.

10 Claims, 34 Drawing Figures

PLANAR AND CYLINDRICAL OSCILLATING PNEUMATODYNAMIC BEARINGS

TECHNICAL FIELD

This invention relates to bearings and more particuarly to oscillating fluid bearings of the planar and cylindrical varieties.

BACKGROUND ART

Frictionless and low-friction bearings are useful in a variety of mechanical instruments, including actuators for the movement of magnetic recording heads in computer disk file systems. One type of bearing which is known to be suitable for this purpose is the externally-pressurized air bearing, i.e. one in which two surfaces are prevented from touching by the flow of air from an external air pump. However, the poor reliability and high cost of such pumps has prevented this type of bearing from finding acceptance in disk files.

A type of bearing which might initially appear to be suitable is the squeeze bearing taught by E. O. Salbu as discussed further below. In this bearing, two closely conforming surfaces are oscillated next to each other to generate a positive load supporting force. However, these bearings, first described in a printed publication in 1964 have a number of drawbacks which have made them unsuitable for a practical application in most technologies:

1. The conforming surfaces are rigid and heavy
2. The transducer which oscillates the surfaces of the bearing must be correspondingly massive.
3. The power dissipation is high.
4. The ratio of bearing weight to load-carrying capacity is too large.
5. Because of the relatively large oscillating mass of the bearing itself, it has been impossible to make the frequency of oscillation higher than the audible range. In fact the previous squeeze bearings designed in accordance with the teachings of Salbu have produced acoustic vibrations which are intolerably loud.
6. The oscillatory forces cause excessive vibration of the object supported by the bearing which is frequently an intolerable characteristic of a bearing, especially where precise location of the object is required, as contrasted to oscillation of location of the object.

U.S. Pat. No. 3,626,510 of Kauzlarich et al for "Hydraulic Bearing System" describes a gyroscope with a hydraulic thrust bearing with a liquid between bearing surfaces, one of which is oscillated normal to the bearing surfaces to generate a positive load supporting force on the bearing. The patent cites the work of E. O. Salbu for "Compressible Squeeze Films and Squeeze Bearings" Trans. ASME Journal of Basic Engineering, June 1964 characterized as teaching that the "Reynolds Equation is used to show that the relative lateral motion between the bearing surfaces produces a nonsymmetrical force per cycle with the greater force occurring on the closing part of the cycle. Such phenomenon is referred to as 'pumping action' provided by the high frequency oscillations and is attributable to compression occurring in a compressible gas film." Such bearings are described as squeeze bearings with a pair of parallel surfaces which derive support by relative axial oscillation of the surfaces at a high frequency. It states later that at high frequency, the gas cannot flow out of the bearing space fast enough to avoid compression. It is also referred to as pumping action attributable to compression occurring in the compressible gas film. Various references are cited there. The Kauzlarich et al patent is a hydraulic derivation of the gas squeeze bearing, with an anticavitation means in the form of a pressurizing means, combined with a partially hemispherical air squeeze bearing at the opposite (upper) end of the shaft. The hydraulic bearing (less curved) is at the bottom. Both are thrust bearings. The lower bearing has a pivot which prevents the lower end of the shaft from coming to rest on the seat.

U.S. Pat. No. 3,339,421 of Warnock for a "Dynamic Gas Film Supported Inertial Instrument" describes a cylindrical PZT piezoelectric cylinder providing gaseous squeeze bearing about the periphery of the cylinder and on its axial ends in a gyroscopic mounting.

U.S. Pat. No. 3,433,538 of Blanding et al "Dynamic Gas Film Bearing Structure" describes an improved air bearing with a resilient ring-like element in the bearing for support of the piezoelectric transducer element along one of the strain axes of the element.

U.S. Pat. Nos. 3,471,205 and 3,359,045 of Farron et al and Hsu, respectively, are both entitled "Squeeze Film Bearings". A cylindrical piezoelectric or magnetostrictive strain producing member vibrates in both axial and radial direction at an ultrasonic frequency. The device provides a simultaneous thrust and journal bearing.

U.S. Pat. No. 4,099,211 of Hathaway "Positionable Transducing Mounting Structure and Driving System Therefor" describes a "bimorph" suspension for a magnetic transducing head. The bimorph is a piezoelectric bender leaf element flexible in lateral directions having axes of polarization extending in the lateral directions. The bimorph is two flat piezoceramic plates bonded to an intervening substrate which bend up or down along the length of a long thin leaf element. On the end of the leaf element is a magnetic recording head for reading an omega video tape drive. The leaf can be doubly articulated with bimorph elements end-to-end bending the leaf in opposite directions in each half. It is an actuator, not a bearing, of course. It does, however, use a bending laminated piezoelectric stack in connection with magnetic recording heads.

U.S. Pat. No. 4,106,065 of Ravizza is for drive circuits for the bimorph actuator of the head of the preceding patent.

U.S. Pat. No. 4,188,645 of Ragle et al for "Piezoelectric Servo for Disk Drive" describes a fine positioning mechanism for a disk read head using several pairs of opposed flexing piezoelectric bending elements to move a read head arm at right angles to the length of the bender elements. The bender elements in each pair are not laminated but are mounted in parallel. With two spaced elements above and below the arm, all bending in the same direction all four elements drive the head in the same direction.

U.S. Pat. No. 3,351,393 of Emmerich for "Piezoelectric Oscillating Bearing" describes a jewel bearing supported pair of disks of oppositely internally polarized piezoelectric elements operative so that (Col. 2 line 60) ". . . as one disk expands the other contracts so that the motion of the bearing 24 supported on the disks is relatively large as compared to that which would be produced by a single oscillating piezolectric support." It mentions gyroscopes and the need for vibrating bearings which reduce friction but it makes no mention of squeeze bearings and seems to be limited to the concept of vibratory mechanical motion caused by impact of the solid materials upon the support for the bearings. The frequency of the oscillators 46, 48 and 58 is not specified.

U.S. Pat. No. 1,860,529 of Cady shows that stacked, laminated, piezoelectric resonators are very old in the art. It does not describe vibrating disks.

U.S. Pat. No. 3,114,848 of Kritz describes a "High Efficiency Sonic Generator" with a piezoelectric sandwich of quartz disks mounted at a nodal circle of the flexing disk. The use is not relevant since it is simply desired to vibrate air, and the device is not employed in bearings or for supporting a structure of any kind.

U.S. Pat. No. 3,304,132 of Broeze et al describes a laminated-disk bearing with annular rings of piezoelectric elements on opposite surfaces of the disk at each end of a gyroscope. The piezoelectric elements are distorted to oscillate the bearings in the direction of the axes of the shafts. The bearings are journal bearings. Broeze U.S. Pat. No. 3,239,283 is a variation on the idea which is less relevant.

Hall U.S. Pat. No. 2,993,739 for a "Magnetostrictive Bearing Assembly" covers a thrust bearing arrangement with opposing magnetostrictive elements vibrating a set of thrust bearings of a sensitive instrument. The magnetostrictive elements are rods which produce oscillations between the two bearings carrying the movement of the instrument.

It appears that the first feature of the disk bearing with cupping and reverse cupping is novel, in view of the above references. The bearing art relative to piezoelectric vibration which involves mechanical contact during operation is fairly crowded. The art of squeeze bearings is not so developed. Cupping bearings have not been used for squeeze bearings. The prior art is replete with bearings involving multiple combinations of piezoelectric vibration. The concept of applying the Kritz or Broeze laminated bearing to the teachings of Salbu has not been found in the prior art, although over 13 years has elapsed since those teachings were published. No prior art has been found on the distorted sleeve bearing. The use of nodal mounting in a vibrating squeeze bearing is also novel.

I examined the possibility of using Salbu type squeeze film bearings for a totally new application: to support the voice coil and head suspension spring of a disk file actuator. The use of a non-contact, internally damped bearing for the support of the voice coil would solve the striction and friction problems of future disk file actuators.

The type of squeeze film bearing discussed by Salbu requires one of the bearing surfaces to vibrate against a thin entrapped air region to produce a squeeze film of superambient pressure. From considerations of load, stiffness and machining tolerances, a minimum vibration amplitude of 2.5 μm is necessary.

Two known methods of producing such a vibration are magnetic and piezoelectric. However, a magnetic actuator produces stray fields and is only capable of "unidirectional motion"—i.e., a thrust bearing. It is not easily used for a journal bearing. Unfortunately, the simple expansion and contraction of a piezoelectric disk is a very small effect. To produce the required amplitude of vibration would require a very thick and undesirably massive transducer (see FIG. 1), even in resonance.

SUMMARY OF THE INVENTION

In accordance with this invention, all of the objections to previous squeeze bearings have been overcome by replacing the rigid oscillatory motion by a flexural (bending) motion of a piezoelectric, magnetostrictive, etc., bimorph, which is attached to the supported object at a nodal point of oscillation. The bearings of this invention vibrate in an inaudible ultrasonic frequency range. They can support on the order of fifty times their own weight and they consume only a few watts of power. In addition, both flat planar bearings and cylindrical journal bearings are easily fabricated in accordance with this new technology.

This is a low friction bearing which can be used for an object such as a meter, gyro, synchro, capstan, servo motor or a magnetic recording head. It utilizes the oscillation of a bearing surface up and down with respect to a second bearing surface.

In the disk form of bearing a column of air beneath the lower surface of the disk rushes in beneath the disk as it rises. The air compresses as the disk drops to provide support. This concept was taught by Erik O. J. Salbu of IBM in 1963. The disk has been modified by the instant invention as shown in FIGS. 2.1–2.4 with two piezoelectric layers laminated or bonded together (or alternatively, one piezoelectric layer bonded together with another material). That makes it possible to produce a piezoelectric disk which oscillates with the outer portion of the disk dropping as shown in FIGS. 2.3 and 3.3 for an applied positive field extending from top to bottom of the disk. When the electric field is reversed to be negative, then the outer portion of the disk rises and the central portion of the disk falls. This motion is analogous to the motion of a bimetallic element which bends into a bowl type of shape which is cupped upwardly and downwardly with rapid oscillations up and down at a frequency in the audio or above the acoustic frequency range. As the disk oscillates, the air rushes in under the upwardly cupped disk. That cupping provides a large peripheral clearance between the edge of the bearing disk and the flat surface upon which the bearing is supported by the air which rushes in and out under the disk as it oscillates. When this disk is cupped upwardly, the air access is easy. When the disk is cupped downwardly, the periphery of the disk is near the flat surface of the bearing upon which the disk is supported and the air is restrained from escaping from the space beneath the downwardly cupped disk. As the disk uncups or passes through its flat position, the air is compressed, thereby raising or lifting the disk and any load it supports. During operation, the oscillating disk lifts away from the bearing support surface and remains separated from it by the air film during all portions of the cycle of oscillation.

Alternatively, the bearing can be a slidable or rotary bearing as shown in FIGS. 8.1 to 9.3 with the hollow sleeve being composed of several separate piezoelectric elements aligned longitudinally along the axis of the sleeve so that with three or four segments there will be a tendency to bend in and out as shown in FIGS. 8.3, 8.4, 9.2 and 9.3. The annular cross section of the sleeve is bent alternately into the two distorted alternate cross sections shown for the positive and reversed (neg.) fields. These cross sections may be elliptical, triangular, square or high order polygons. FIGS. 8.3 and 8.4 show a triangular cross section.

Features of the invention are as follows:

(1) An oscillating pneumatodynamic bearing utilizing oscillating cupping and reverse cupping bearings. The mounting can be made at a nodal (motionless) position which eliminates vibration of the supported object. No shock absorber or compliant mounting is required.

(2) A distorted squeeze bearing sleeve about a central rod is adapted for a journal bearing.

(3) Operation is optimized by operating at the frequency which produces mechanical resonance of the disk or sleeve.

This method comprises a squeeze film bearing with a low mass transducer and reduced mechanical vibration of the supported parts.

This invention uses a sandwich construction of piezoelectric material to generate the required vibration. The operation is similar to a bimetallic disk, in which one layer expands while the other contracts, producing a net bending (see FIGS. 2.1–2.4 and 3.1–3.4). Although this construction has been used to produce transducers for other applications, I am not aware of its use for a squeeze bearing.

A second problem in the practical application of this bearing is that the required fundamental vibration of the bearing surface causes an undesired vibration of the supported structure. The voice coil and head suspension mount of a disk actuator should be free from these vibrations. The problem can be minimized for any design or method of generating a squeeze film by using a very high fundamental frequency of vibration and by having a high ratio of supported mass to bearing mass.

This invention further reduces the amplitude of vibration transmitted to the supported mass (e.g., the voice coil) by attaching that mass at a node of vibration of the piezoelectric bender element sandwich structure. (The amplitude of vibration of he piezoelectric bender is small or zero at the node.) This concept is not easily generalized to other methods of producing the vibration.

The bearing described is a disk-shaped thrust bearing. Such a bearing could be used as the primary constraint against one degree of freedom in a disk file actuator. It can be combined with other squeeze bearings or other types of bearings, such as a swing arm, to provide a complete bearing system.

The concept of a piezoelectric bender element squeeze bearing can be extended to a journal bearing which would provide constraint against four degrees of freedom. The possible shapes of the cross section of such a cylindrical bearing are sketched in FIGS. 6.1–6.3, 7.1–7.4, 8.1–8.4 and 9.1–9.3.

BRIEF DESCRIPTION OF THE DRAWINGS

FIGS. 2.1 to 2.4 show a laminated disk-shaped squeeze bearing in accordance with this invention, including nodal mounting of electrical leads.

FIGS. 3.1 to 3.4 show sectional views of the bearings of FIGS. 2.1 to 2.4, respectively.

FIGS. 6.1–6.3 show a pneumatodynamic or sgueeze bearing of a tubular design in a perspective view varying from a vertically stretched shape in FIG. 6.1 to an at rest shape in FIG. 6.2 and to a horizontally stretched shape in FIG. 6.3.

FIGS. 7.1–7.3 show the general shapes corresponding to the shapes in FIGS. 6.1–6.3, respectively.

FIG. 7.4 shows the composite of the shapes of FIGS. 7.1–7.3 with the nodes of non-deformation indicated for a tube which is composed of four segments running parallel about the tubular shape, with respect to its longitudinal axis as illustrated in detail in FIGS. 9.1–9.3.

FIG. 8.1 shows a tubular squeeze bearing whose shapes in deformation are shown in a set of end views in FIGS. 8.2–8.4 for a tube segmented into six sections which deform alternately.

FIGS. 9.1–9.3 show the construction of a set of four segments of a tube as explained in connection with FIG. 7.4. The shape of the electrodes (in FIGS. 9.1–9.3) is unwrapped and flattened in FIG. 9.4.

FIG. 9.5 is a fragmentary showing of the tube with the electric field on opposite sides of a gap in the conductive layer.

FIG. 10.1 shows an end view of linear actuator for a magnetic recording head with the squeeze bearings of this invention employed to support the armature with two disks below and three on one side.

FIG. 10.2 shows a left elevation of the actuator of FIG. 10.1. The disks are vertically extending and are mounted on horizontal shafts.

In accordance with this invention, a low friction fluid bearing assembly includes in combination a support, a bearing cooperating with the support, an object carried upon the bearing for frictionless movement upon the support, and transducer material selected from magnetostrictive, electrostrictive and piezoelectric materials included in the bearing. The improvement comprises lamination of at least one transducer material in the bearing, whereby the bearing flexes and unflexes at the frequency of excitation applied to the bearing.

In another aspect of this invention, a low friction fluid squeeze bearing assembly includes in combination a stationary support, a squeeze bearing associated with the support, and an object carried upon the bearing for frictionless movement upon the support. The improvement comprises mechanically mounting the bearing at a mechanical node of its vibration, whereby vibration of the object by the bearing is minimized.

A low friction fluid squeeze bearing assembly includes in combination a support, a bearing surface on the support, an object supported by a bearing disk for movement along the surface, and piezoelectric material included in the disk. The improvement comprises lamination of at least one disk of piezoelectric material in the bearing disk, whereby the bearing disk sequentially cups and uncups at the frequency of excitation applied to the bearing.

A low friction fluid squeeze bearing assembly includes in combination, a support, a bearing rod attached to the support, an object supported by a bearing tube for movement with respect to the axis of the rod, and piezoelectric material included in the tube. The improvement comprises lamination of at least one segment of piezoelectric material in the bearing tube, whereby the tube flexes at the frequency of excitation applied to the bearing.

Preferably, the electrical connections to the transducer or bearing actuator are provided at the mechanical nodes of the transducer as it vibrates.

A preferred application for the above bearings is to support an actuator carrying a magnetic recording head in a disk file or the like.

Still another preferred embodiment of the invention is to employ a tubular member either inside or outside of a rod or cylinder which is the transducer or actuator member.

In a particular embodiment of the invention on one side of the armature of the disk actuator, there is located a tubular bearing of the pneumatodynamic variety and on the other side is located a disk-shaped bearing.

In another disk file arrangement, at least two disks ride on one bearing surface and one disk rides on another bearing surface to support the armature.

A bearing includes a transducer mechanically oscillating at a predetermined frequency, and a mechanical support. The transducer has at least one predetermined locus of minimal oscillation comprising a node. Mechanical connections of the transducer are made to the support at points on the locus.

Preferably the bearing includes electrical lines connected to the transducer at points located upon such a locus.

DESCRIPTION OF THE PREFERRED EMBODIMENT

Figure 1:
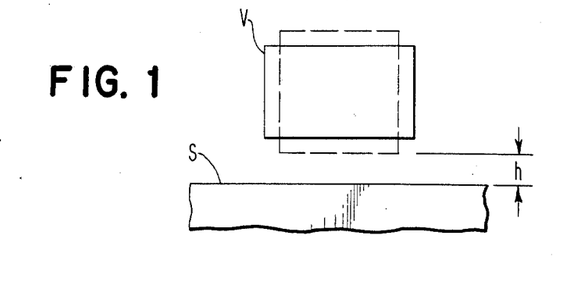
FIG. 1 shows a sketch of an object vibrating above a surface to provide a squeeze bearing in accordance with the prior art.

FIG. 1 shows a sketch of a prior art form of squeeze bearing of the variety described by Salbu, cited above. The vibrating structure V is suspended above the surface S by the air entrapped under the structure V as it is vibrated up and down. The solid-line shape of structure V is its shape when an electric field is applied and the dotted-line shape is the shape of the structure V when there is no applied field. This is preferably a direct use of the piezoelectric effect to generate bearing vibration with the dimensions greatly exaggerated for the purpose of explanation. Another method of producing the vibration is magnetic force applied to the suspended portion of the bearing. The height to which the structure V is raised is shown by the formula $h = h_o + d \sin W_o t$, where, for example, d is about 0.005 mm and $h_o$ is about 0.01 mm. The value $h_o$ is the average height, d is amplitude of vibration, and $W_o$ is frequency of vibration. The problem is that for most materials of bulk dimensions such as is shown in FIG. 1, bonding or distortion beyond 1 part in $10^4$ will break the materials. Thus, in order to obtain the amplitude of vibration required to move the structure V with a vibration of 2.5 micrometers, which is preferred in a typical application, the structure V must be 2.5 cm thick. That requires a suspended bearing with a very large mass in relationship to the load suspended in many cases. Such a heavy bearing will tend to slow down acceleration of light loads in response to actuation of the load by a motor.

FIG. 2.1 shows a laminated, cupping-disk bearing actuator A composed of at least one layer of piezoelectric material P and another layer M. Transducer A has a vibratory nodal circle which does not move as the disk is deformed as shown in FIGS. 2.2 and 2.3. Note that FIGS. 3.1 to 3.3 show sectional views of FIGS. 2.1 to 2.3.

Figure 4:
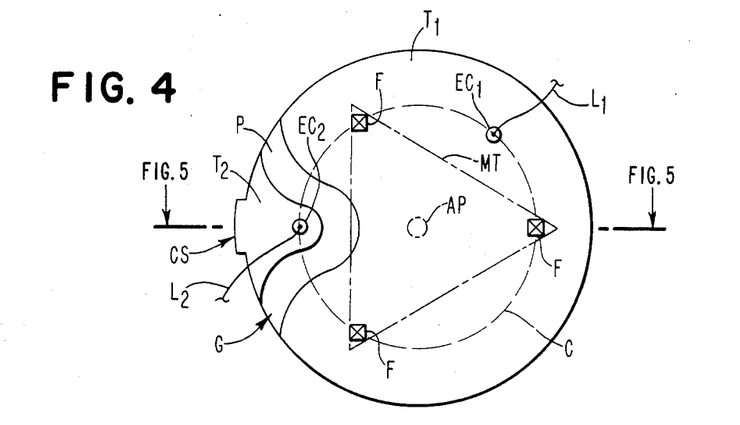
FIG. 4 shows a plan view of a disk-shaped squeeze bearing in accordance with the instant invention with the details of construction shown more fully than in preceding drawings.
Figure 5:
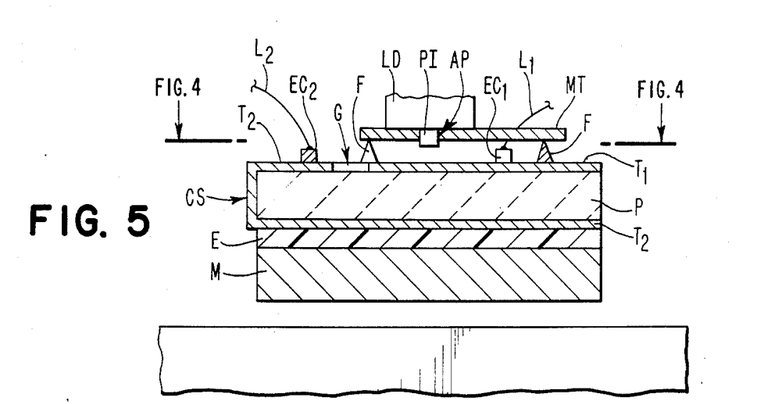
FIG. 5 is a sectional view of the bearing of FIG. 4 taken along line 5—5 in FIG. 4.

Electrical contacts $EC_1$ and $EC_2$ (not shown in FIGS. 2.2-2.4 and 3.1-3.4 but shown in greater detail in FIGS. 4 and 5) are connected to the upper and lower surfaces of the piezoelectric layer P with lines $L_1$ and $L_2$ shown connected to the top and the bottom of the transducer A in an oversimplified embodiment for the sake of illustration. In FIGS. 3.1 to 3.4, a lower contact $EC_2$ is shown and line $L_2$ is shown in a location which is selected to facilitate explanation. A preferred method of connection is shown in FIGS. 4 and 5. In FIGS. 2.2 and 3.2 the upper lead $L_1$ is connected to the negative terminal of the battery B which cups the transducer A upwardly. In FIGS. 2.3 and 3.3, the upper lead $L_1$ is connected to the positive terminal of the battery B and the lower lead $L_2$ is connected to negative terminal of the battery cupping the transducer A downwardly. The cupping and uncupping action is provided at a predetermined frequency of oscillator O in FIGS. 2.4 and 3.4 to afford a continuous oscillation of the transducer A with the outer periphery of the transducer A flapping and the inner disk inside the nodal circle C pumping upwardly and downwardly with the solid transducer A cupped downwardly and the dotted transducer A' cupped upwardly.

Figure 24:
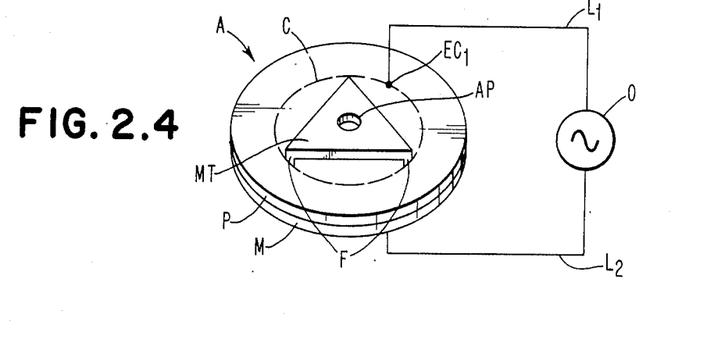
Figure 31:
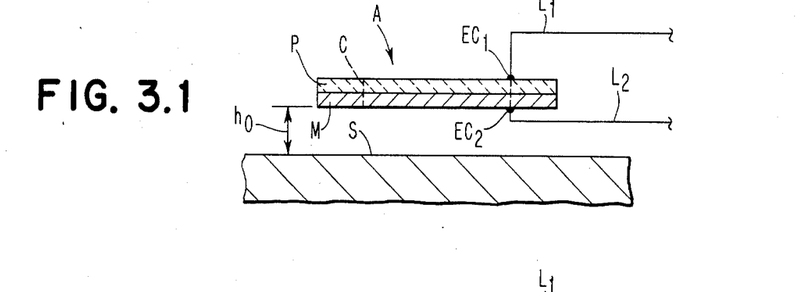
Figure 32:
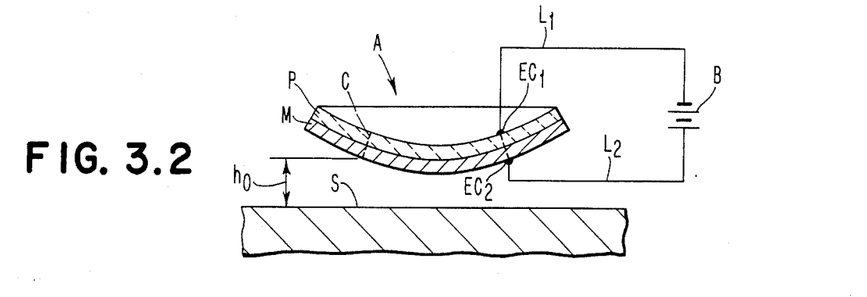
Figure 33:
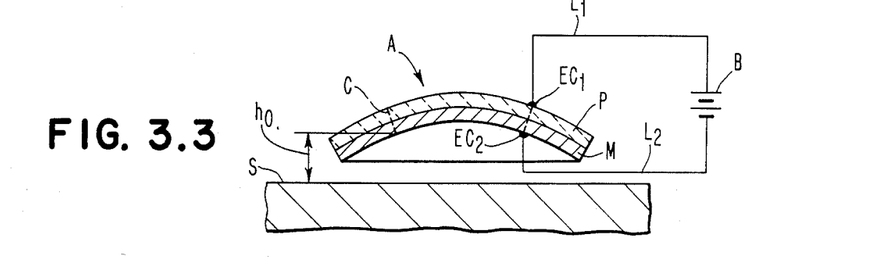
Figure 34:
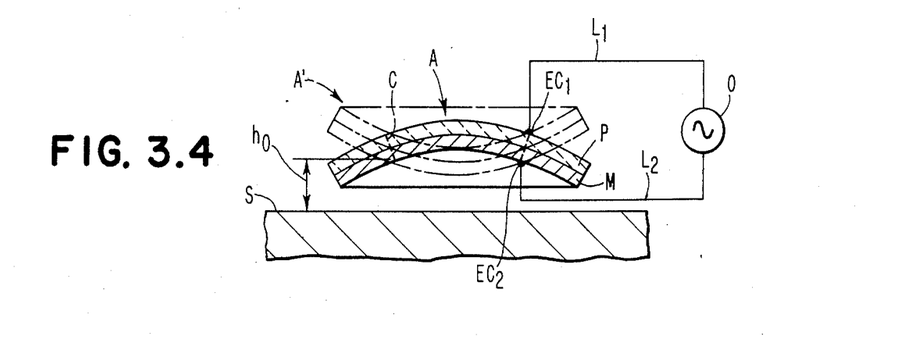
Figures 61, 62, 63, 71, 72, 73, 74:
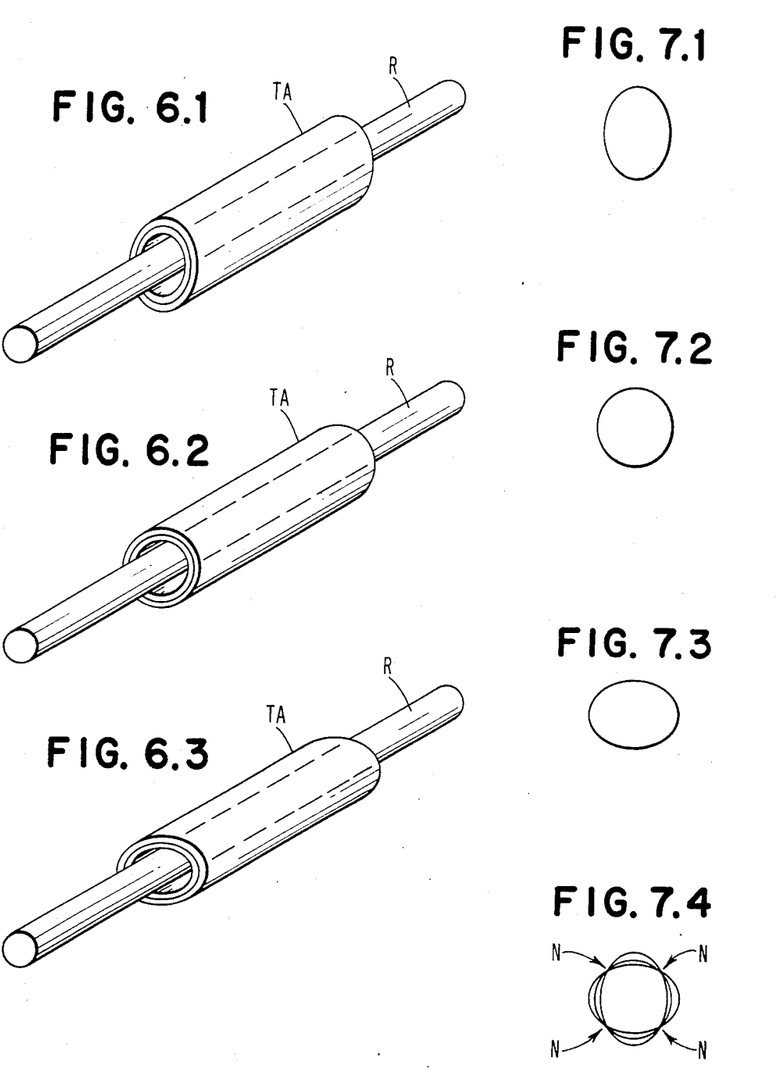
Figure 81:
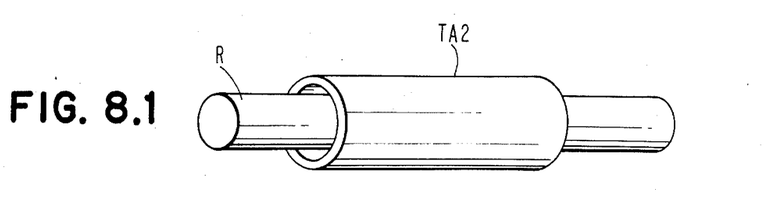
Figure 82:
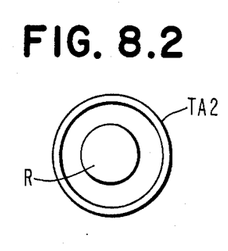
Figure 83:
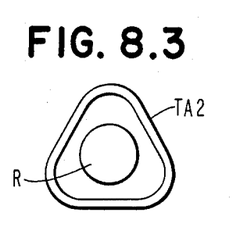
Figure 84:
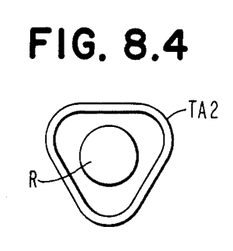
Figures 91, 92, 93:
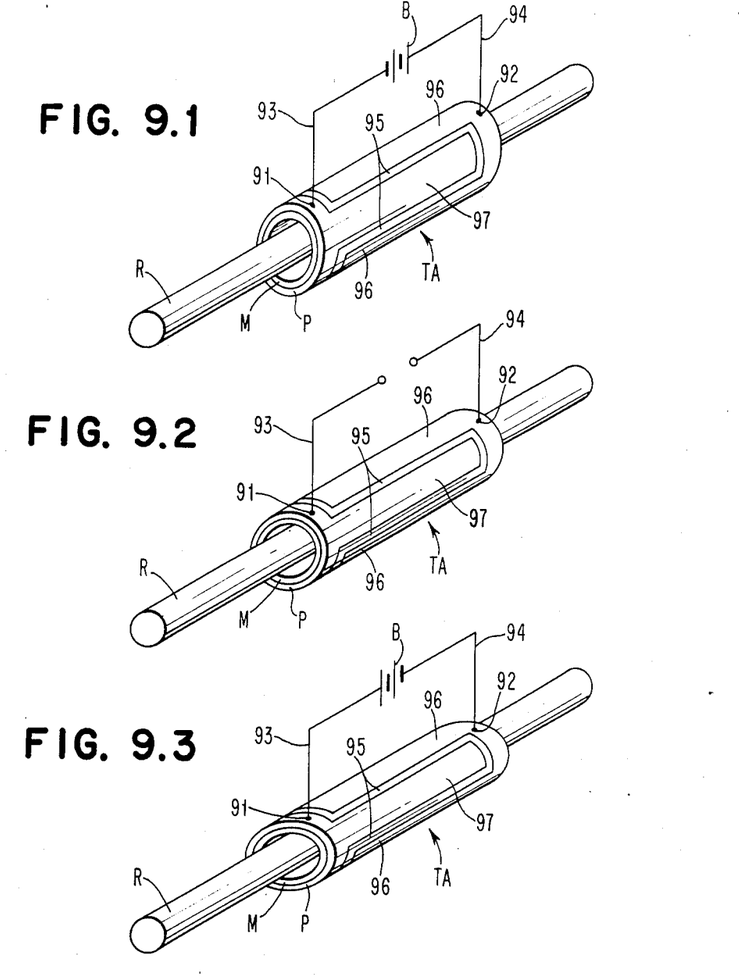
Figure 94:
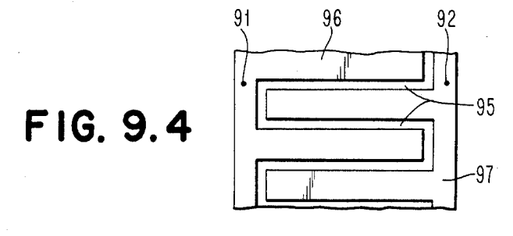

I have determined experimentally that the operation of such a laminated disk performs essentially in this manner to suspend a load held by the mount MT shown in FIGS. 2.4, 4 and 5. The mount MT includes an aperture AP for receiving a pin PI on the base of the load LD carried by the bearing's disk-actuator A. The mount MT is secured to the upper surface of the disk-transducer A by means of feet F. Triangular arrangement of the feet F and the mount MT are thought to be particularly appropriate in view of the flexibility of the disk A and the need for stability and light weight. Obviously, polygonal and rounded supports with multiple feet can be employed so long as the feet are attached at points on the nodal circle. The reason for attaching at the nodal circle is that the vibration of the disk-transducer A is substantially zero or at a null at that locus so the vibration transmitted to the load LD is minimized.

Referring to the disk-actuator A of FIGS. 4 and 5 which is a practical application of the principle illustrated in FIGS. 2.1-3.4, a laminated structure is used. It can be 16.5 mm in diameter, 1 mm thick, 1.5 gm in mass, uses 2 watts of electrical energy at 28 khz, with a 10 micrometer flying height, a 100 gm thrust load and 30 gm-cm torque load. The lowest layer is a disk of molybdenum, preferably about 0.5 mm thick and about 15 mm in diameter. Next an epoxy layer E about 20 micrometers thick is used to secure the molybdenum to a thin film metallized layer $T_2$ of nickel plate about 1 micrometer thick. A layer P of PZT piezoelectric ceramic of lead zirconate titanate is next. It is 0.5 mm thick. A contact strap CS extends up the side of the piezoelectric layer P. The upper layer of the structure is metallization which is split between terminals $T_1$ and $T_2$ which connect electrically principally to the upper surface of piezoelectric layer P for $T_1$ and the lower surface of layer P for $T_2$. Terminals $T_1$ and $T_2$ are both on the top side of the disk A in order that the electrical contacts can be located on the nodal circle C to minimize stress on the leads $L_1$ and $L_2$. The fact that the potential of terminal $T_2$ is exposed to a portion of the upper surface of layer P is not a problem because the surface area covered by electrode $T_2$ is sufficiently small.

The terminals $T_1$ and $T_2$ are separated by the serpentine gap G shown in FIG. 4 and discernible in FIG. 5 upon close inspection in front of the lefthand foot F of the mount MT.

FIGS. 6.1, 6.2 and 6.3 show a journal bearing arrangement with a rod R carrying the tubular transducer TA composed of a laminated piezoelectric structure analogous to that of the disk-shaped actuator described above. Details of construction are discussed in connection with FIGS. 8.1 to 9.5. In FIG. 6.1 the tubular shape of actuator TA is shown with the cross-sectional shape in FIG. 7.1 oversimplified to be an ellipse with a long vertical axis. In FIGS. 6.2 and 7.2, the horizontal and vertical axes are equal to form a circular shape. In FIGS. 6.3 and 7.3 the horizontal axes are long forming an ellipse with a long horizontal axis. FIG. 7.4 shows the configurations of the tubular cross section for the vertical and horizontal elliptical shapes superimposed upon the circular cross section. It should be noted that for this four-segment tubular arrangement that there are four nodal lines N along the shape which do not move as the tube oscillates. This is possible since the tubular arrangement is constructed in accordance with FIGS. 9.1–9.5.

FIGS. 8.1–8.4 show the arrangements of the rod R and a modified transducer $TA_2$ composed of six surfaces which give the triangular shapes shown in FIGS. 8.3 and 8.4 as current in the piezoelectric material, is reversed. The "at rest" shape is shown by the cross section in FIG. 8.2.

In FIGS. 9.1 to 9.3 the tubular arrangement of FIGS. 6.1 to 6.3 are shown with a practical arrangement of electrodes required in order to make the tube deform in accordance with the desired requirements. The tubular transducer TA is comprised of an inner tubular portion M, of molybdenum. About that is formed a tubular layer of piezoelectric material P. Upon most of the outer surface of the layer P is formed a thin film of plated metal in the form of electrodes 96 and 97 separated by a groove 95 which is shown in FIG. 9.4.

FIG. 9.4 shows the external surface of the tubular actuator in FIGS. 9.1–9.3 unwrapped to provide a flat surface in order to clarify the shape which is somewhat confusing in the perspective view of FIGS. 9.1–9.3. The electrical contacts 91 and 92 are aligned with the groove 95 where the node of the tube will be located. The inner molybdenum portion of the tubular actuator TA is at an intermediate electrical potential between the values at contacts 91 and 92 so that the deformation of the two sets of segments 97 and 96 separated by the groove 95 will be in opposite directions and will provide a vibratory oscillation which pressurizes the space between the tubular transducer TA and the rod R so there is no mechanical contact and a very low friction journal bearing is provided for slidable (or rotary) motion along the rod R with extremely low friction.

Figure 95:
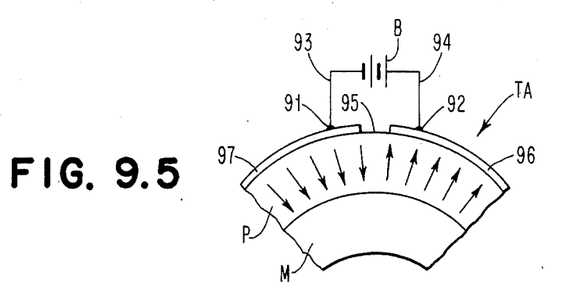

FIG. 9.5 is an end view of a fragment of tubular transducer TA with the electric field on either side of the groove 95. The location of electrical contacts 91 and 92 are changed in order to show that the portion of transducer TA under the electrode 96 expands when it is positive, while the reverse is true of the portion under electrode 97 when it is negative. An example of a tubular actuator arrangement is to employ a rod with an outside diameter of 9.517 mm and an inner diameter of the tubular actuator TA of 9.543 mm for a gap of 0.0125 mm between the surface of the rod and the actuator both top and bottom (side-to-side) when centered. The peak vibration amplitude of the actuator TA is about 0.01 mm.

The electrode material is nickel plated to a thickness of 1–3 micrometers and the groove G is about 250–500 micrometers wide. The tubular suspension is stiff and has lower load capacity if the clearance is tight. It is also more susceptible to humidity affecting the loading of the bearing with condensed water. If the clearance is loose, then a greater load can be carried, positioning is less precise and the parts are easier to fabricate. If the suspension is not stiff enough, then play in the bearing can be excessive and accuracy of positioning is sacrificed.

The electrode pattern on an elliptical mode tube (journal) bearing consists primarily of four axially symmetrical electrodes as shown in FIGS. 9.1–9.4. The opposite electrodes 91 and 92 are connected either by discrete wires or by small annular patterns at the ends of the plated electrode as shown in FIGS. 9.1–9.4. The electric field resulting from an application of voltage is shown in FIG. 9.3. Since the PZT piezoelectric ceramic is poled uniformly outwardly and the electric field is of opposite polarity under adjacent electrodes, the strain in the PZT material will be opposite under adjacent electrodes, causing one region to bend outwardly and the adjacent region to bend inwardly. Whether the PZT/molybdenum laminate bends inwardly or outwardly varies with the product of the sign of the applied field and the sign of the poling direction of the PZT. In the above (recent) example in FIGS. 9.1–9.5, the PZT material was poled uniformly outwardly and the direction of the applied field under adjacent electrodes was changed in order to cause one region under one electrode to bend inwardly and the region under an adjacent electrode to bend outwardly. However, the PZT tube can be poled in opposite direction in different regions.

For example, the electrode pattern described in the previous example of FIGS. 9.1–9.5 could be used to pole the PZT material non-uniformly, by heating the PZT material to 150° C. and applying a field of 20 V/mil to the PZT material. Subsequent to this poling operation, the electrodes are bridged so that the entire outer surface of the PZT tube becomes an electrode and the entire inner surface becomes another electrode. The adjacent quadrants of the PZT material distort differently because although the field is uniform radially, the poling is opposite in adjacent quadrants. An added feature of this latter poling is that the voltage required to drive the device is reduced in half. However, the current required to drive the device is doubled. The total power required is identical in either example for the same bearing load capacity.

In the cases in which the squeeze bearing contains a piezoelectric bimorph of disparate materials, such as PZT with alumina or PZT with molybdenum, it should be recognized that a thermal expansion bimorph (analogous to a bimetallic strip) exists. This will cause physical warpage, and ultimate bearing failure, if the temperature is changed over a sufficiently large range. This problem can be overcome, if required, by use of differently poled PZT for both halves of the bimorph, or by the use of a ceramic such as cordierite which can be matched in thermal expansion coefficient to that of PZT.

An additional constraint in the design of squeeze bearings is to avoid bearing failure caused by condensation of moisture in the bearing or on the bearing surfaces during the compression portion of the oscillatory cycle of air captured between the surfaces of the bearing. This reduces the effectiveness of such bearings under conditions of very high humidity, although heating of the bearing can be employed for the purpose of minimizing or eliminating the problem. Heating reduces the local relative humidity in the bearing when ambient conditions include high humidity. Alternatively, the bearing can be used in a hermetically sealed container or in a controlled (air conditioned) atmosphere.

Construction of Flat Thrust Bearing

A flat disk piezoelectric ceramic for the transducer A of the bearing is obtained from a manufacturer (Clevite, Vernitran Piezoelectric Division, PZT-4, 0.063 cm thick by 2.5 cm diameter). The disk, as obtained, is typically not flat enough. The disk is lapped on both sides to a flatness of 5 micrometers and a thickness of 0.05 cm. The disk is thus cut by an ultrasonic cutter to a diameter of 1.65 cm.

A flat disk of a matching material such as sapphire, alumina, mullite, SiC, or molybdenum is obtained in the same diameter and approximately the same thickness. However, one side of this disk will be the bearing surface. This bearing surface must be very flat. A typical flatness is 4 waves, as measured by an optical reference flat and 546 nm light.

For testing and experimental purposes, it is useful to have a conductive bearing surface to monitor touching (bearing failure). For this reason, either a conductive bearing surface disk such as molybdenum or SiC should be used or the nonconductive disk (sapphire, alumina, mullite, etc.) should be plated on all sides.

The PZT disk (and the sapphire disk if desired for touching sensing), must be nickel plated on all sides. Then the plating is removed from most but not all of the edge of the PZT disk to form the conductive strap. Plating may be removed by mechanically grinding or sanding or by masking and etching. Additionally, a top surface electrode pattern is sandblasted, ground or etched into the PZT (see FIGS. 4 and 5). Additional electrode patterns may be cut for feedback electrode to keep the device in resonance.

Next the PZT and sapphire disks are epoxy bonded together and allowed to cure at room temperature. The epoxy may be conductive to facilitate electrical contact to the bottom bearing surface, if touch sensing is desired. If touch sensing is not desired, the epoxy may be nonconductive.

Figure 21:
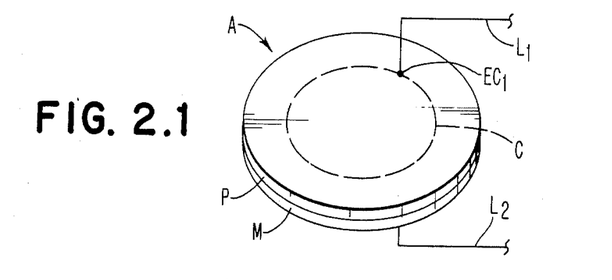
Figure 22:
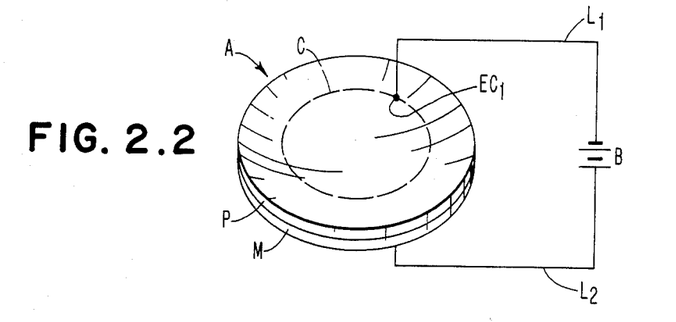
Figure 23:
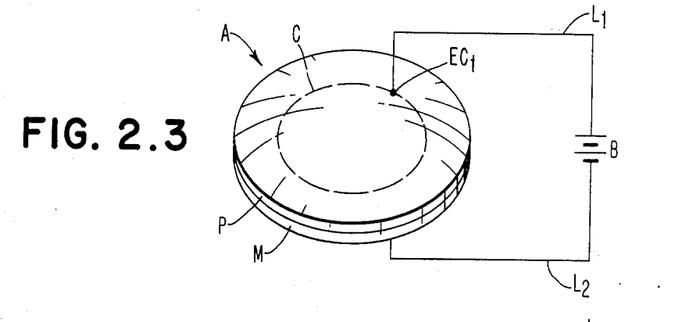

The electrical contacts and mechanical mounting to the PZT/sapphire laminate are made at the node of mechanical resonance. The diameter of the node for the resonance of FIGS. 2.1 to 2.3, is at 0.68 of the disk diameter (0.68×1.65 cm=1.12 cm node diameter). Electrical contacts are made by soldering fine wires to the plating at the nodes. Mechanical mounting is achieved by epoxying a three-point stand MT onto the PZT surface. This stand MT must be rigid and strong enough to support the load that the bearing carries, but not so rigid as to enable differential thermal expansion between the load and the PZT/sapphire laminate to cause bending of the laminate. In practice this is easily achieved; a three-point mechanical mount MT can be formed of nylon or Vespel (trademark of E. I. du Pont de Nemours & Co. for SP polyimide) with feet F (legs) or points that are 0.03 cm in diameter and 0.05 cm high.

Figure 13:
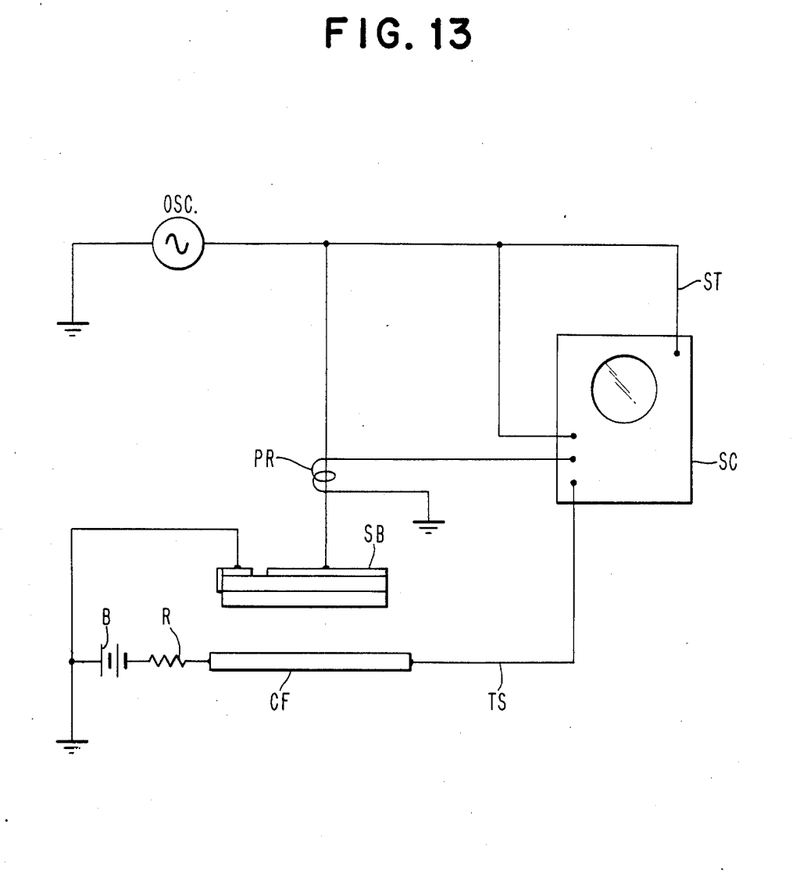
FIG. 13 shows a test circuit for a squeeze bearing.

The completed laminate is placed on a conductive optically flat surface and tested as shown in FIG. 13.

Testing

The oscillator OSC is turned on and the mechanical resonance is found by observing the relative phase of the current and voltage waveforms on the oscilloscope SC. At a frequency below the resonant frequency, the laminate SB acts as a capacitor, with the current and voltage out of phase. At resonance, the laminate SB acts as a resistor, with the current and voltage substantially in phase.

The oscillator (OSC) frequency (20–50 khz) is thus adjusted for resonance. Other circuits may be used to keep the oscillator frequency automatically at the resonant frequency. These circuits may employ phase-locked loops or feedback electrodes and are known to electrical engineers skilled in the art. The oscilloscope SC is connected to synchronizing trigger ST and current probe PR coupled to the lead to laminate SB.

Operation of the bearing SB is observed by monitoring the touch sensor TS output. As the amplitude of the oscillator drive voltage is increased, the laminate SB will suddenly lift off the plate by 5 to 35 micrometers and become frictionless. When the bearing SB becomes frictionless, the slightest tilt to the conductive flat CF or the slightest tug on the electrical leads will cause the laminate SB to move. The touch sensor TS will then show the open circuit voltage of the battery B. At intermediate levels of drive, insufficient for truly frictionless operation, the laminate SB may appear to be somewhat frictionless, but the touch sensor TS, as monitored by the oscilloscope SC, will show that the laminate SB is touching the conductive flat CF, perhaps once each drive cycle. This intermediate range of operation is not truly frictionless and will, in time, cause wear of the two touching surfaces and production of particulates and other wear products. The voltage and power required for true squeeze bearing operation (no touching) depends on the uniformity of the materials, bonding and the flatness of the laminate and conductive flat CF. A well made laminate SB may have a resonance at 30 khz with a quality factor of 300 and require 3.5 v rms and 10 ma rms to support 100 grams of load.

Tube Journal Squeeze Bearing

A tubular journal squeeze bearing TA is made in a similar way, with the inner tube either of molybdenum (drilled, reamed and lapped), plated alumina or cordierite (ground and lapped). The inside diameter of the inner tube is 0.9543 in diameter and 1.40 cm long. The wall thickness is approximately 0.08 cm. The outer tube is PZT-4, 1.27 cm long ground to an inside diameter that is 25 micrometers larger than the outside diameter of the inner tube. The wall thickness of the PZT is approximately 0.08 cm, bringing the outside diameter of the PZT to approximately 1.29 cm. The PZT and inner tube are plated and an electrode pattern is produced as in the previous example. (See FIG. 4 for pattern.) The two tubes are bonded together with the use of a wicking type of epoxy of low viscosity and then electrical contacts are made at the nodes of the PZT and at the node of the outside of the inner tube (which is longer than the PZT and hence accessible), for touch sensing. Testing and operation proceeds as before, except that a mating conductive rod of diameter 0.9518 cm is used instead of a flat.

Figure 101:
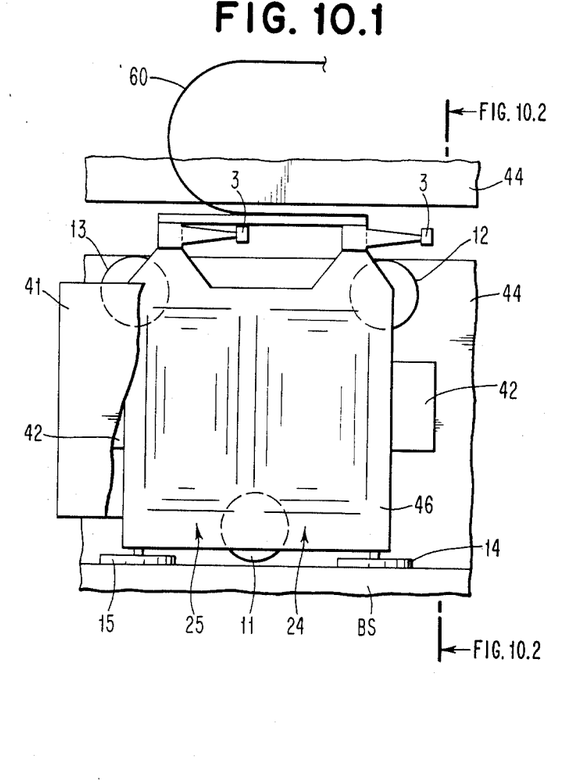
Figure 102:
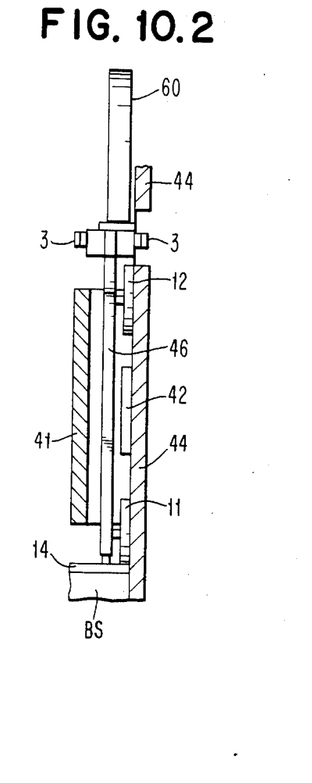

FIGS. 10.1 and 10.2 show left end and front elevational views of an armature 46 carrying magnetic recording heads 3 connected resilient berilium-copper by wires in strap 60. A base 4 of magnetizable metal 44 serves also as the flat surface upon which three squeeze bearing disks 11, 12 and 13 ride carrying the armature 46 with its windings 24 and 25. Permanent magnets 42 and 43 (not shown) cooperate With the windings 24 and 25 as described in detail in Scranton et al "Low Mass Actuator System for Magnetic Recording Disks with Half Strength End Poles" Ser. No. 221,866 filed Dec. 31, 1980 which is incorporated herein by reference, and Garwin et al "Low Mass Actuator System for Magnetic Recording Disks" Ser. No. 221,607 filed Dec. 31, 1980 which is also incorporated herein by reference. A lower set of disks 14 and 15 ride upon the surface of base BS which thereby supports the armature.

Figure 11:
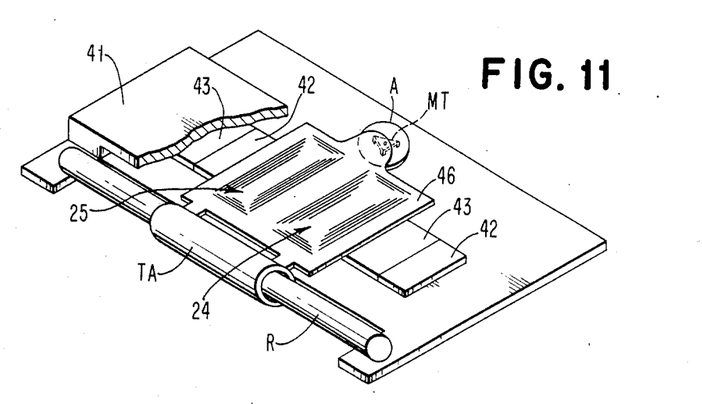
FIG. 11 shows a perspective view of a linear actuator for a disk file head which is provided with both a tubular squeeze bearing and a single disk bearing in combination.

FIG. 11 shows an armature 46 of the type shown in FIGS. 10.1 and 10.2 with the modification that the left hand bearing TA and R is a rod R and tube TA which are also squeeze bearings of the kind described above. An actuator A in the form of a disk carrying a mount MT as shown in FIGS. 4 and 5 carries the end of the armature 46 opposite from the tubular bearing TA and R.

Figure 12:
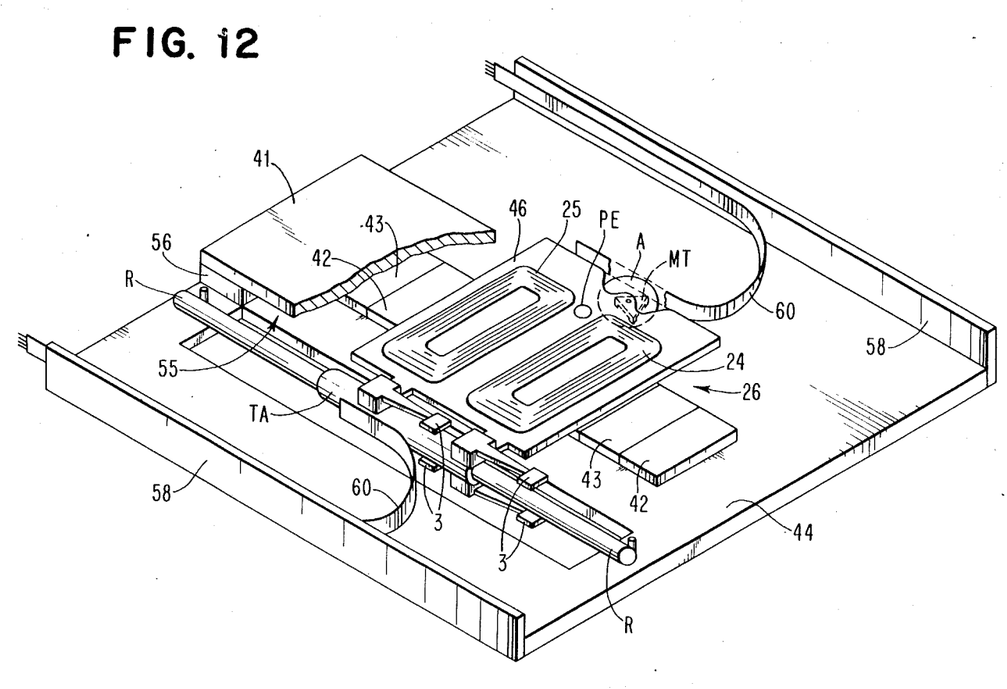
FIG. 12 shows a more detailed perspective view of an embodiment of the actuator of FIG. 11.

FIG. 12 shows the device of FIG. 11 with the magnetic heads 3 and the straps 60, etc., included as described above in greater detail in Scranton and Garwin et al patent applications. A disk of permalloy ferromagnetic alloy PE is shown on the surface of armature 26 which designed to cooperate with magnetic poles 42 and 43 which will pull the permalloy down toward the magnetic poles, to hold the armature 46 down in place on the supporting surface.

For both the tube or flat bearing the bearing is composed of a laminated transducer and a second part: the mating, cooperating flat or rod. These two parts are frictionless with respect to each other. Either (A) the load to be supported is attached to the laminated transducer and the cooperating flat or rod is mounted to the stationary base of the structure or (B) the load to be supported is attached to the flat or rod and the laminated transducer is mounted to the stationary base of the structure. In case A, the transducer and its associated electrical leads moves with the moving load to be supported, while in case B, the transducer is stationary (except for the small amplitude vibration, d, necessary for operation).

Figure 14:
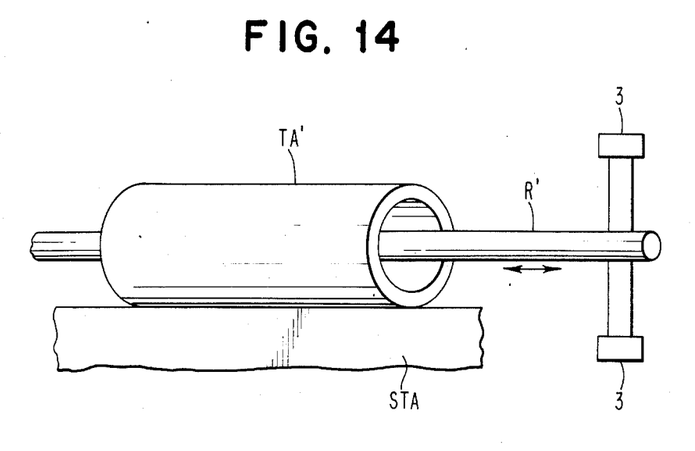
FIG. 14 shows a tubular squeeze bearing in accordance with this invention wherein the transducer is affixed to a support and the cylindrical rod reciprocates within the transducer. The tubular transducer is mounted at its nodal locus to minimize vibration of the rod. The rod carries a load.

FIG. 14 shows a modification of the structure of the above embodiments in accordance with the preceding paragraph. Here, the transducer TA' is mounted to a stationary surface STA along a nodal line as in FIGS. 9.1–9.3 where the wires are secured along the line of groove 95. In this way, vibration of TA' relative to the rod R' suspended within it is minimized. Rod R' is suspended by the pneumatodynamic effect described above. Another bearing can be aligned at the other end of rod R not shown to provide two point support for the rod R. At the end of rod R is mounted the load which in this case is a set of magnetic recording heads 3.

Figure 15:
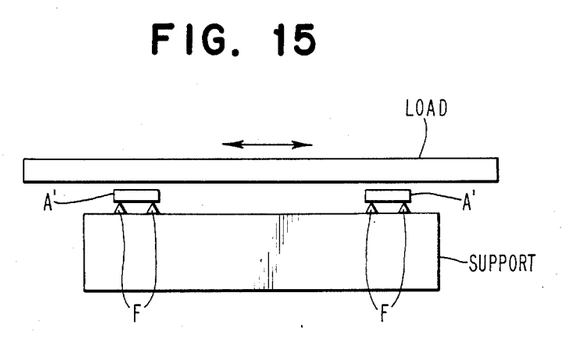
FIG. 15 shows a modification of the disk form of squeeze bearing in which the disk-shaped transducer is mounted to a support rigidly by means of feet secured to its nodal locus, whereby vibration is minimized and the load rides upon the disk-shaped transducers by means of the pneumatodynamic pressures generated in accordance with this invention.

FIG. 15 is a schematic drawing of an embodiment of the disk type of squeeze bearing in which the transducer is affixed to a support and the flat surface of load L rides upon the air pressure created pneumatodynamically by the disks A' which are a set of disk transducers secured by feet F to the support. The load can move back and forth along the direction of the double headed arrow in an arrangement analogous to that of FIG. 10 or 11.

What is claimed is:

1. A low friction fluid bearing assembly including in combination,
    a supporting surface,
    a squeeze bearing cooperating with said supporting surface to fly on said supporting surface,
    an object carried upon said bearing for frictionless movement upon said support,
    said squeeze bearing including a transducer adapted for flexing of said bearing to produce fluid pressure to generate a positive supporting fluid force for a load to be carried on said squeeze bearing, and transducer material selected from magnetostrictive, electrostrictive, and piezoelectric materials included in said bearing,
    said squeeze bearing comprising at least one said transducer material laminated and bonded with another material to form a transducer for said bearing,
    said bearing flexing and unflexing in response to the frequency of excitation applied to said bearing,
    said flexing and unflexing of said bearing compressing ambient air by the mechanical oscillation of said transducer as it flexes and unflexes to cause said squeeze bearing to fly on said compressed air on said supporting surface,
    said bearing having mechanical nodes of flexing and unflexing.

2. A low friction fluid squeeze bearing assembly including in combination,
    a stationary support,
    said squeeze bearing being associated with said support and cooperating therewith to fly on said support,
    said squeeze bearing including a transducer adapted for flexing of said bearing to produce fluid pressure to generate a positive supporting fluid force for an object carried on said squeeze bearing,
    said object being carried on said squeeze bearing for frictionless movement upon said support,
    said squeeze bearing flexing and unflexing during excitation of said transducer,
    said bearing being mounted at a mechanical node of its said flexing and unflexing,
    whereby vibration of said object by said bearing is minimized.

3. A low friction fluid squeeze bearing assembly including in combination,
    said squeeze bearing including a transducer adapted for flexing of said bearing to produce fluid pressure to generate a positive supporting fluid force for an object to be carried on said squeeze bearing,
    a support,
    a bearing surface on said support,
    said squeeze bearing being associated with said support and cooperating therewith to fly on said support,
    an object supported by a bearing disk for movement along said surface,
    piezoelectric material included in said disk, and said disk comprising at least one disk of piezoelectric material laminated and bonded to another material in said bearing disk,
whereby said bearing disk cups and uncups in response to the frequency of excitation applied to said bearing disk.

4. A tubular low friction fluid squeeze bearing assembly including in combination,
said squeeze bearing including a tubular transducer including a bearing tube,
a support,
a bearing rod,
said bearing rod carrying said bearing tube, and said bearing rod being attached to said support,
said squeeze bearing being adapted for flexing of said tubular transducer to produce fluid pressure between said bearing rod and said bearing tube to generate a positive supporting fluid force permitting said bearing tube to fly on the surface of said bearing rod to support said bearing tube with said fluid force,
an object supported by said bearing tube for movement with respect to the axis of said rod with said positive supporting fluid force providing said support,
and piezoelectric material included in said tube.
said first tube of piezoelectirc material being laminated with and bonded to another material to form said bearing tube,
whereby said tube flexes in response to the frequency of excitation applied to said bearing.

5. Apparatus in accordance with claims 1, 2, 3, or 4 wherein electrical connection to said transducer is provided at the mechanical nodes of said transducer during flexing thereof.

6. Apparatus in accordance with claims 1, 2, 3, or 4 wherein said object comprises an actuator for a magnetic recording head.

7. An assembly comprising a low friction fluid bearing including in combination a support said bearing cooperating with said support, an object carried upon said bearing for frictionless movement upon said support, and transducer material selected from magnetostrictive, electrostrictive and piezoelectric materials included in said bearing, the improvement comprising lamination of at least one said transducer material with another material to form a transducer for said bearing, whereby the bearing flexes and unflexes responsive to the frequency of excitation applied to said bearing, said bearing supporting an armature for magnetic recording head with both a tubular actuator and a disk-shaped actuator supporting different portions of said armature.

8. In a low friction fluid squeeze bearing assembly including in combination a support, a bearing surface on said support, an object supported by a bearing disk for movement along said surface, and piezoelectric material included in said disk, the improvement comprising lamination of at least one disk of piezoelectric material in said bearing disk, whereby the bearing disk cups and uncups responsive the frequency of excitation applied to said bearing a plurality of said bearing disk being applied to an armature for a magnetic recording head with two of said bearing disks riding on one bearing surface and at least one of said bearing disks riding on another bearing surface.

9. An assembly comprising
a low friction fluid squeeze bearing
an object for supporting an armature carrying a magnetic recording head,
a pair of stationary supports,
a pair of squeeze bearings associated with said supports,
said object being carried upon said bearings for frictionless movement upon said supports
mechanically mounting each said bearing at a mechanical node of its vibration, whereby vibration of said object by said bearing is minimized,
said object supporting said armature carrying said magnetic recording head of a magnetic recording disk drive for reciprocation of said armature and said head thereon along said supporting surface,
said object being supported by a first of said squeeze bearings comprising a disk-shaped actuator cooperating with a flat surface support,
said disk-shaped actuator being adapted for flexing and unflexing of said bearing to produce fluid pressure to generate a positive supporting force for a load to be carried by said actuator flying as a squeeze bearing on said flat surface,
said object also being supported by a second of said squeeze bearings;
said second squeeze bearing comprising a tubular bearing including a tubular actuator cooperating with a second one of said supports,
said second one of said supports comprising a rod, and
said tubular actuator being adapted for flexing and unflexing to produce fluid pressure between said actuator and said rod to generate a positive supporting force causing said tubular member to fly on the surface of said rod, thereby providing support for a load to be carried by said tubular bearing,
whereby said tubular actuator flies as a squeeze bearing on said rod, and said magnetic head on said object is supported by said tubular bearing and said first squeeze bearing to provide a low friction support for said armature and said head.

10. A fluid bearing assembly comprising
a support (16; 100),
an object (32, 108) to be supported with low friction by the support,
said bearing member being connected to said support or to said object,
and oscillatory means (12, 14; 46) connected to said bearing member for electric or magnetic excitation thereof,
said bearing member being designed to change its physical dimensions in response to the excitation applied to said bearing member by said oscillatory means, in response to the frequency of excitation, thereby causing air pressure variations between said bearing member and the support or the object in order to support the object by a squeeze bearing effect which causes said bearing to fly with respect to said support or said object,
said bearing member (4, 6; 100) being a laminate of at least two layers (4 and 6; 70 and 72), at least one layer (4; 70) being of a transducer material responsive to the excitation,
said layers being such as to cause said bearing member to flex and unflex.

* * * * *